US012776690B2

(12) United States Patent
Nakayama et al.

(10) Patent No.: US 12,776,690 B2
(45) Date of Patent: Oct. 27, 2026

(54) ROTATING ELECTRIC MACHINE

(71) Applicant: DENSO CORPORATION, Kariya-city (JP)

(72) Inventors: Takahiro Nakayama, Kariya-city (JP); Ritsuro Hiramatsu, Kariya-city (JP)

(73) Assignee: DENSO CORPORATION, Kariya (JP)

( * ) Notice: Subject to any disclaimer, the term of this patent is extended or adjusted under 35 U.S.C. 154(b) by 225 days.

(21) Appl. No.: 18/634,108

(22) Filed: Apr. 12, 2024

(65) Prior Publication Data

US 2024/0275242 A1 Aug. 15, 2024

Related U.S. Application Data

(63) Continuation of application No. PCT/JP2022/037559, filed on Oct. 7, 2022.

(30) Foreign Application Priority Data

Oct. 12, 2021 (JP) ................................ 2021-167389

(51) Int. Cl.
*H02K 11/215* (2016.01)
*H02K 1/276* (2022.01)
*H02K 21/16* (2006.01)

(52) U.S. Cl.
CPC ......... *H02K 11/215* (2016.01); *H02K 1/2773* (2013.01); *H02K 21/16* (2013.01); *H02K 2213/03* (2013.01)

(58) Field of Classification Search
CPC ........ H02K 1/27; H02K 1/276; H02K 1/2773; H02K 11/215; H02K 21/16; H02K 2213/03; H02K 29/08
See application file for complete search history.

(56) References Cited

U.S. PATENT DOCUMENTS 6,555,940 B2 * 4/2003 Naito .................. H02K 1/2766 310/156.55
2002/0036438 A1 * 3/2002 Nishiyama ............. H02K 1/276 310/156.56
2003/0011265 A1 * 1/2003 Hattori ................. H02K 1/2766 310/156.38

(Continued)

FOREIGN PATENT DOCUMENTS

JP 2009-261154 A 11/2009
JP 2013-207817 A 10/2013

(Continued)

OTHER PUBLICATIONS

WO-2021199419-A1, all pages (Year: 2021).*
Nov. 8, 2022 International Search Report issued in International Patent Application No. PCT/JP2022/037559.

*Primary Examiner* — Naishadh N Desai
(74) *Attorney, Agent, or Firm* — Oliff PLC

(57) ABSTRACT

A rotating electric machine includes: a rotor having a permanent magnet embedded in a magnet-receiving hole of a rotor core; a stator that applies a rotating magnetic field to the rotor; and a magnetic sensor that detects rotation information of the rotor. The permanent magnet has a folded shape that is convex inward in a radial direction of the rotor. The magnetic sensor is arranged to face the permanent magnet and configured to be capable of detecting magnetic flux from the permanent magnet.

8 Claims, 7 Drawing Sheets

(56) References Cited

U.S. PATENT DOCUMENTS

| | | | | |
|---|---|---|---|---|
| 2003/0030343 | A1* | 2/2003 | Naito | H02K 1/274 310/156.56 |
| 2009/0230803 | A1 | 9/2009 | Nakayama et al. | |
| 2013/0026888 | A1 | 1/2013 | Migita et al. | |

FOREIGN PATENT DOCUMENTS

| | | | | |
|---|---|---|---|---|
| JP | 2017-117897 | A | 6/2017 | |
| JP | 2019-022393 | A | 2/2019 | |
| JP | 2019-103321 | A | 6/2019 | |
| WO | WO-2021199419 | A1 * | 10/2021 | H02K 11/215 |

* cited by examiner

ROTATING ELECTRIC MACHINE

CROSS-REFERENCE TO RELATED APPLICATIONS

The present application is a continuation application of International Application No. PCT/JP2022/037559 filed on Oct. 7, 2022, which is based on and claims priority from Japanese Patent Application No. 2021-167389 filed on Oct. 12, 2021. The entire contents of these applications are incorporated by reference into the present application.

BACKGROUND

1 Technical Field

The present disclosure relates to rotating electric machines.

2 Description of Related Art

There is disclosed, for example in Japanese Unexamined Patent Application Publication No. JP 2013-031298 A, a rotor of a rotating electric machine. The rotor includes a rotor main body having a rotor magnet provided on an outer circumferential surface of a rotor core to face a stator, and a sensor magnet provided separately from the rotor main body. That is, the rotor is a surface permanent magnet rotor which has the rotor magnet provided on the outer circumferential surface of the rotor core. Moreover, the rotating electric machine also has a magnetic sensor arranged near the sensor magnet so that magnetic flux from the sensor magnet can be detected by the magnetic sensor. Consequently, based on a signal outputted from the magnetic sensor, it is possible to acquire rotation information such as a rotational position of the rotor. In the rotating electric machine, since the sensor magnet is provided separately from the rotor main body, there is room for improvement in terms of reducing the number of parts of the rotating electric machine.

Moreover, there is disclosed, for example in Japanese Unexamined Patent Application Publication No. JP 2019-022393 A, a rotating electric machine in which a sensor magnet is formed integrally with a rotor magnet. Specifically, the rotor magnet has a portion thereof protruding more than an end face of a rotor core in an axial direction. The protruding portion of the rotor magnet constitutes the sensor magnet; and a magnetic sensor is arranged near the protruding portion. Consequently, it becomes possible to form the rotor magnet and the sensor magnet into one integrated component. As a result, it becomes possible to suppress increase in the number of parts of the rotating electric machine.

SUMMARY

In the rotating electric machine disclosed in Japanese Unexamined Patent Application Publication No. JP 2019-022393 A, the magnetic sensor is arranged near the protruding portion of the rotor magnet that is provided on an outer circumferential surface of the rotor core. Therefore, there is a problem that the arrangement position of the magnetic sensor in a radial direction is limited to the vicinity of the outer circumferential surface of the rotor core.

The present disclosure has been accomplished in consideration of the above problem.

According to the present disclosure, there is provided a rotating electric machine which includes: a rotor having a permanent magnet embedded in a magnet-receiving hole of a rotor core; a stator that applies a rotating magnetic field to the rotor; and a magnetic sensor that detects rotation information of the rotor. The permanent magnet has a folded shape that is convex inward in a radial direction of the rotor. The magnetic sensor is arranged to face the permanent magnet and configured to be capable of detecting magnetic flux from the permanent magnet.

With the above configuration, it is possible to acquire the rotation information of the rotor based on the magnetic flux from the permanent magnet of the rotor which is detected by the magnetic sensor. That is, it becomes possible to detect rotation of the rotor without providing any sensor magnet for rotation detection separately from the permanent magnet of the rotor. Consequently, it becomes possible to suppress increase in the number of parts of the rotating electric machine. Moreover, the permanent magnet of the rotor is not provided on an outer circumferential surface of the rotor core, but embedded in the rotor core. Furthermore, the permanent magnet has the folded shape that is convex inward in the radial direction of the rotor. Therefore, the radial range within which the permanent magnet is provided in the rotor is widened. Consequently, it becomes possible to configure the rotating electric machine so that the arrangement position of the magnetic sensor is not limited to the vicinity of the outer circumferential surface of the rotor core. As a result, it becomes possible to improve the degree of freedom in arranging the magnetic sensor in the rotating electric machine.

DESCRIPTION OF EMBODIMENTS

Hereinafter, an embodiment of a rotating electric machine will be described.

Figure 1:
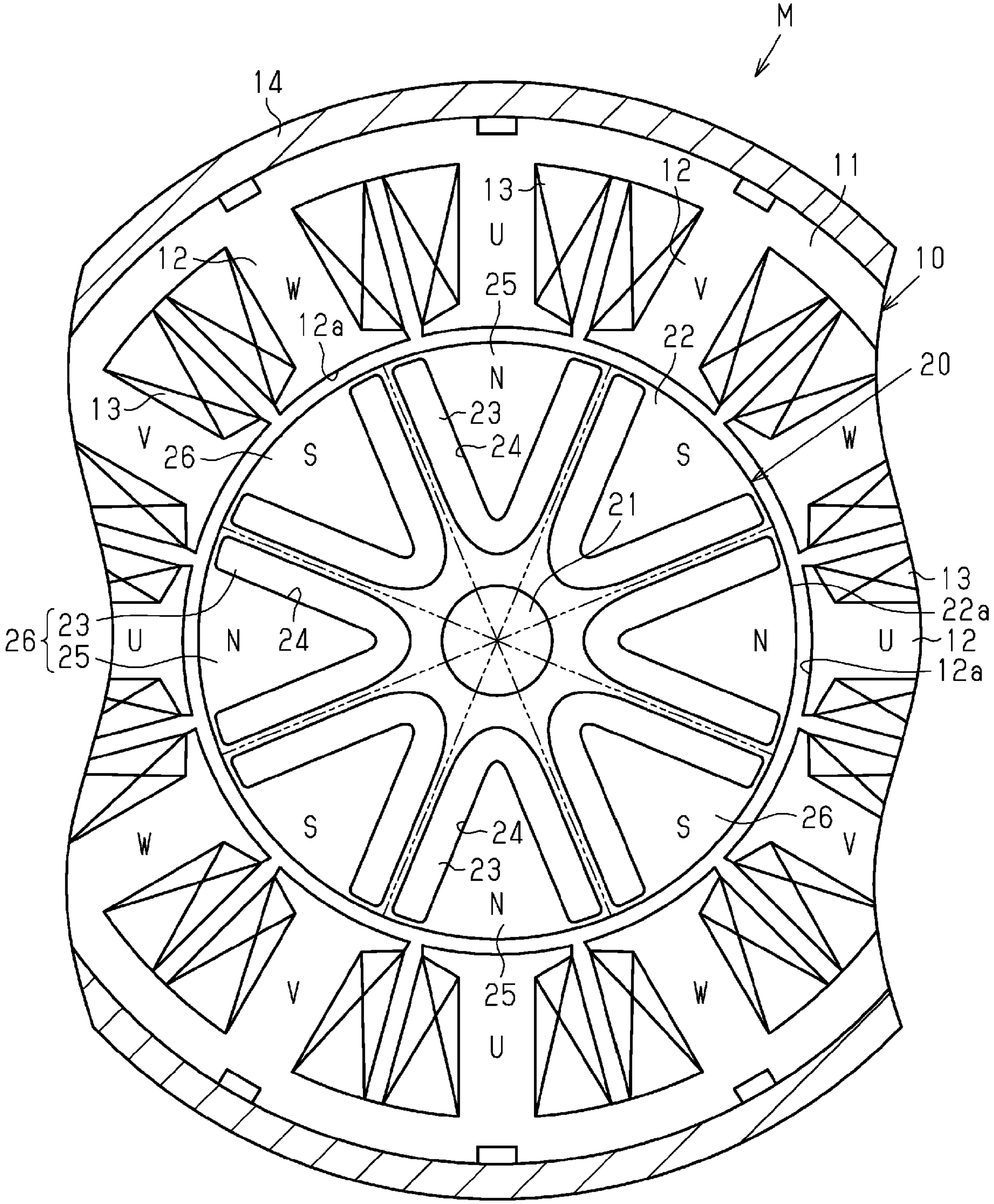
FIG. 1 is a configuration diagram of a rotating electric machine according to an embodiment.
Figure 2:
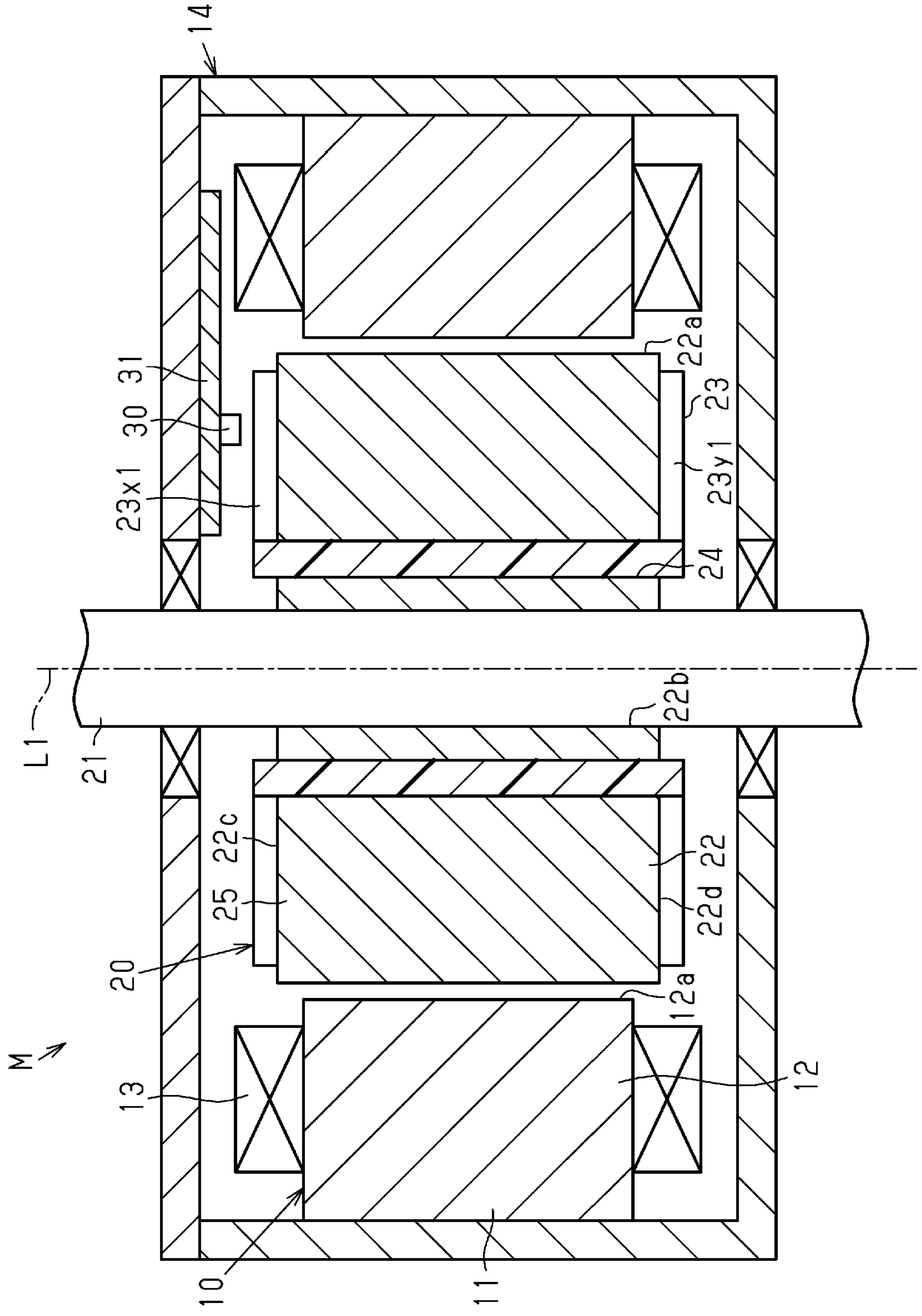
FIG. 2 is a schematic cross-sectional view of the rotating electric machine according to the embodiment.

As shown in FIGS. 1 and 2, a rotating electric machine M according to the present embodiment is configured as an interior permanent magnet brushless motor. The rotating electric machine M includes a substantially annular stator 10 and a substantially cylindrical rotor 20 that is rotatably arranged in a space radially inside the stator 10. The stator 10 is configured to apply a rotating magnetic field to the rotor 20.

(Stator 10)

The stator 10 includes a substantially annular stator core 11. The stator core 11 is formed of a magnetic metal material. For example, the stator core 11 may be formed by laminating a plurality of magnetic steel sheets in the direction of an axis L1 (see FIG. 4). The stator core 11 has a plurality (more particularly, twelve in the present embodiment) of teeth 12 extending radially inward and arranged at equal intervals in a circumferential direction. All the teeth 12 are identical in shape to each other. Each of the teeth 12 has a substantially T-shaped radially inner end portion (i.e., distal end portion) and a distal end surface 12*a* formed in an arc shape along an outer circumferential surface of the rotor 20. Windings 13 are wound around the teeth 12 in a concentrated winding manner. The windings 13 are connected in three phases to respectively function as a U-phase, a V-phase and a W-phase as shown in FIG. 1. Upon supply of electric power to the windings 13, the stator 10 generates a rotating magnetic field, thereby driving the rotor 20 to rotate. In the stator 10, an outer circumferential surface of the stator core 11 is fixed to an inner circumferential surface of a housing 14.

(Rotor 20)

The rotor 20 includes a rotating shaft 21, a substantially cylindrical rotor core 22 having the rotating shaft 21 inserted in a central part thereof, and a plurality (more particularly, eight in the present embodiment) of permanent magnets 23 embedded in the rotor core 22. The rotor core 22 is formed of a magnetic metal material. For example, the rotor core 22 may be formed by laminating a plurality of magnetic steel sheets in the direction of the axis L1 shown in FIG. 4. The rotor 20 is rotatably arranged with respect to the stator 10, with the rotating shaft 21 supported by bearings (not shown) provided in the housing 14.

The rotor core 22 has a plurality of magnet-receiving holes 24 for receiving the permanent magnets 23 therein. More particularly, in the present embodiment, eight magnet-receiving holes 24 are formed at equal intervals in the circumferential direction of the rotor core 22. Each of the magnet-receiving holes 24 has a folded substantially V-shape that is convex radially inward. That is, all the magnet-receiving holes 24 are identical in shape to each other. Moreover, each of the magnet-receiving holes 24 is formed to extend over the entire axial length of the rotor core 22.

In the present embodiment, the permanent magnets 23 are implemented by bonded magnets that are formed by molding and solidifying a magnet material; the magnet material is a mixture of a magnet powder and a resin. More specifically, in the present embodiment, the magnet-receiving holes 24 of the rotor core 22 serve as forming molds. The permanent magnets 23 are formed by: filling the magnet material, which has not been solidified, into the magnet-receiving holes 24 of the rotor core 22 by injection molding without any gaps remaining therein; and then solidifying the magnet material in the magnet-receiving holes 24. Consequently, the external shape of the permanent magnets 23 conforms to the shape of the magnet-receiving holes 24 of the rotor core 22. Moreover, in the present embodiment, each of the permanent magnets 23 is formed to partially protrude from a pair of axial end faces 22*c* and 22*d* of the rotor core 22 (see FIG. 4 and the like). More specifically, each of the permanent magnets 23 has an embedded magnet portion 23*m* located in a corresponding one of the magnet-receiving holes 24 of the rotor core 22 and a pair of protruding portions 23*x*1 and 23*y*1 that protrude respectively from the axial end faces 22*c* and 22*d* of the rotor core 22. The protruding portions 23*x*1 and 23*y*1 of the permanent magnets 23 can be easily realized by providing, in forming molds (not shown) for closing the magnet-receiving holes 24 that open to the axial end faces 22*c* and 22*d* of the rotor core 22, recesses for forming the protruding portions 23*x*1 and 23*y*1. In the present embodiment, a samarium-iron-nitrogen-based (i.e., SmFeN-based) magnet powder is employed as the magnet powder for forming the permanent magnets 23. It should be noted that other rare-earth magnet powders may alternatively be employed as the magnet powder for forming the permanent magnets 23.

Figure 3:
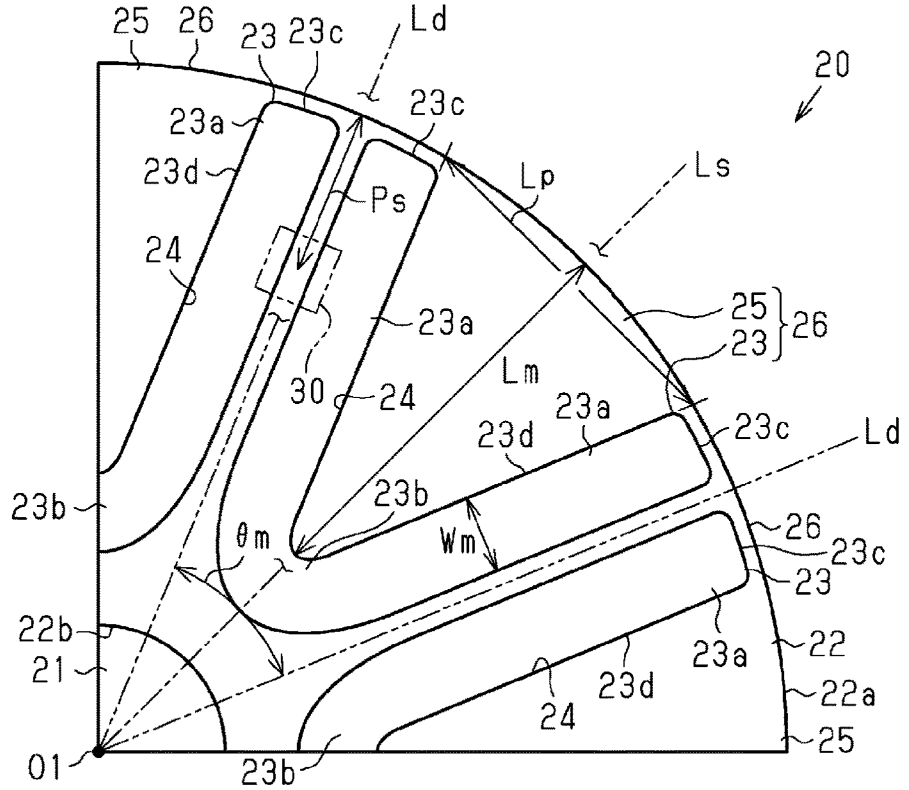
FIG. 3 is a configuration diagram of a rotor according to the embodiment.

Each of the permanent magnets 23 has a folded substantially V-shape that is convex radially inward. More specifically, as shown in FIG. 3, each of the permanent magnets 23 has a shape such that the radially inner ends of a pair of straight portions 23*a* are connected by a curved portion 23*b*. The radially outer ends 23*c* of the pair of straight portions 23*a* are located near the outer circumferential surface 22*a* of the rotor core 22. Each of the permanent magnets 23 has a constant thickness Wm at any location in the V-shaped path including the pair of straight portions 23*a* and the curved portion 23*b*. Moreover, each of the permanent magnets 23 has an axisymmetric shape with respect to a circumferential centerline Ls thereof passing through an axis center O1 of the rotor 20. Furthermore, the permanent magnets 23 are located in close proximity to magnetic-pole boundary lines Ld each extending between an adjacent pair of the permanent magnets 23 and through the axis center O1 of the rotor 20. The angle between each adjacent pair of the magnetic-pole boundary lines Ld, i.e., the magnetic-pole opening angle θm of each rotor magnetic pole 26 including one of the permanent magnets 23 is 180° in electrical angle.

For each of the V-shaped permanent magnets 23, the distance between the intersection points between extension lines of inside surfaces of the straight portions 23*a* of the permanent magnet 23 and the outer circumferential surface 22*a* of the rotor core 22 is defined as a magnetic pole pitch Lp; and the distance on the circumferential centerline Ls of the permanent magnet 23 from the outer circumferential surface 22*a* of the rotor core 22 to an inside surface of the curved portion 23*b* of the permanent magnet 23 is defined as an embedding depth Lm. In the present embodiment, each of the permanent magnets 23 is formed to have a deep folded shape such that the embedding depth Lm is larger than the magnetic pole pitch Lp. That is, in the present embodiment, for each of the V-shaped permanent magnets 23, the magnet surface 23*d* of the permanent magnet 23, which is constituted of the inside surfaces of the straight portions 23*a* and curved portion 23*b* of the permanent magnet 23, is set to be larger than the magnet surface of a well-known surface permanent magnet rotor (not shown). Setting the embedding depth Lm to be large, the curved portions 23*b* of the permanent magnets 23 are located radially inward near a shaft insertion hole 22*b* which is formed in the central part of the rotor core 22 and in which the rotating shaft 21 is inserted. It should be noted that: the above-described folded shape is merely an example of the shape of the permanent magnets 23; and the permanent magnets 23 may be suitably modified to have other shapes, such as a folded substantially V-shape with a small embedding depth Lm or a folded substantially U-shape with a large curve portion 23*b*. In the rotor 20 according to the present embodiment, since each of the permanent magnets 23 has a folded substantially V-shape that is convex radially inward, it becomes easy to set the radial range within which the permanent magnets 23 are provided to be wider than that in the aforementioned surface permanent magnet rotor.

Figure 4:
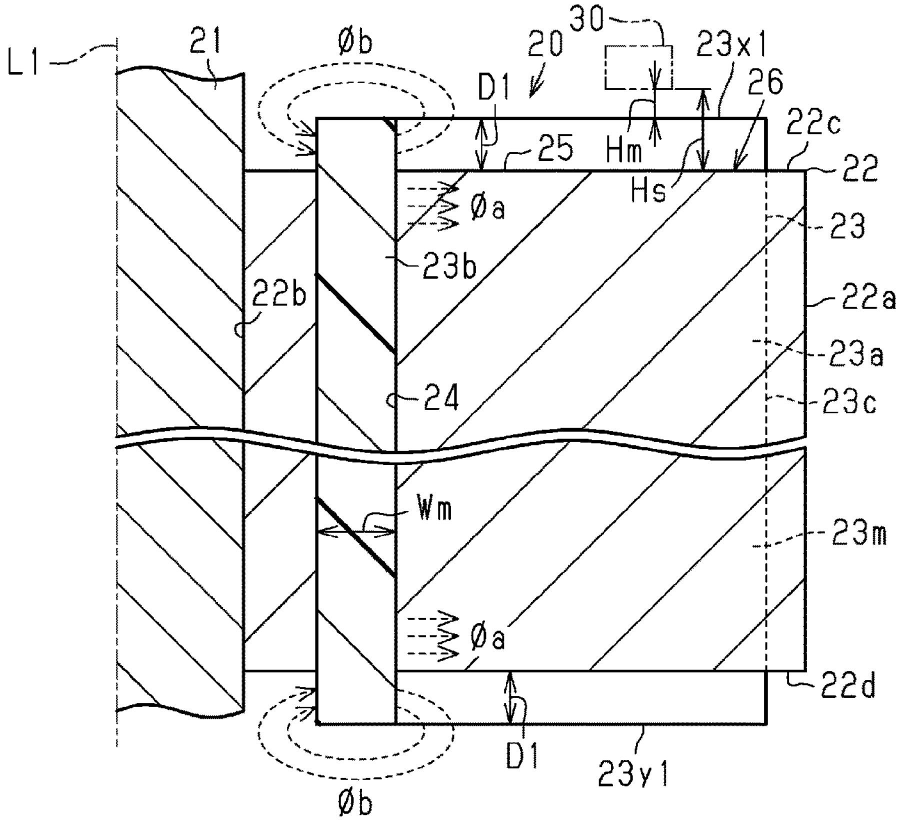
FIG. 4 is a cross-sectional view of the rotor according to the embodiment.
Figure 5:
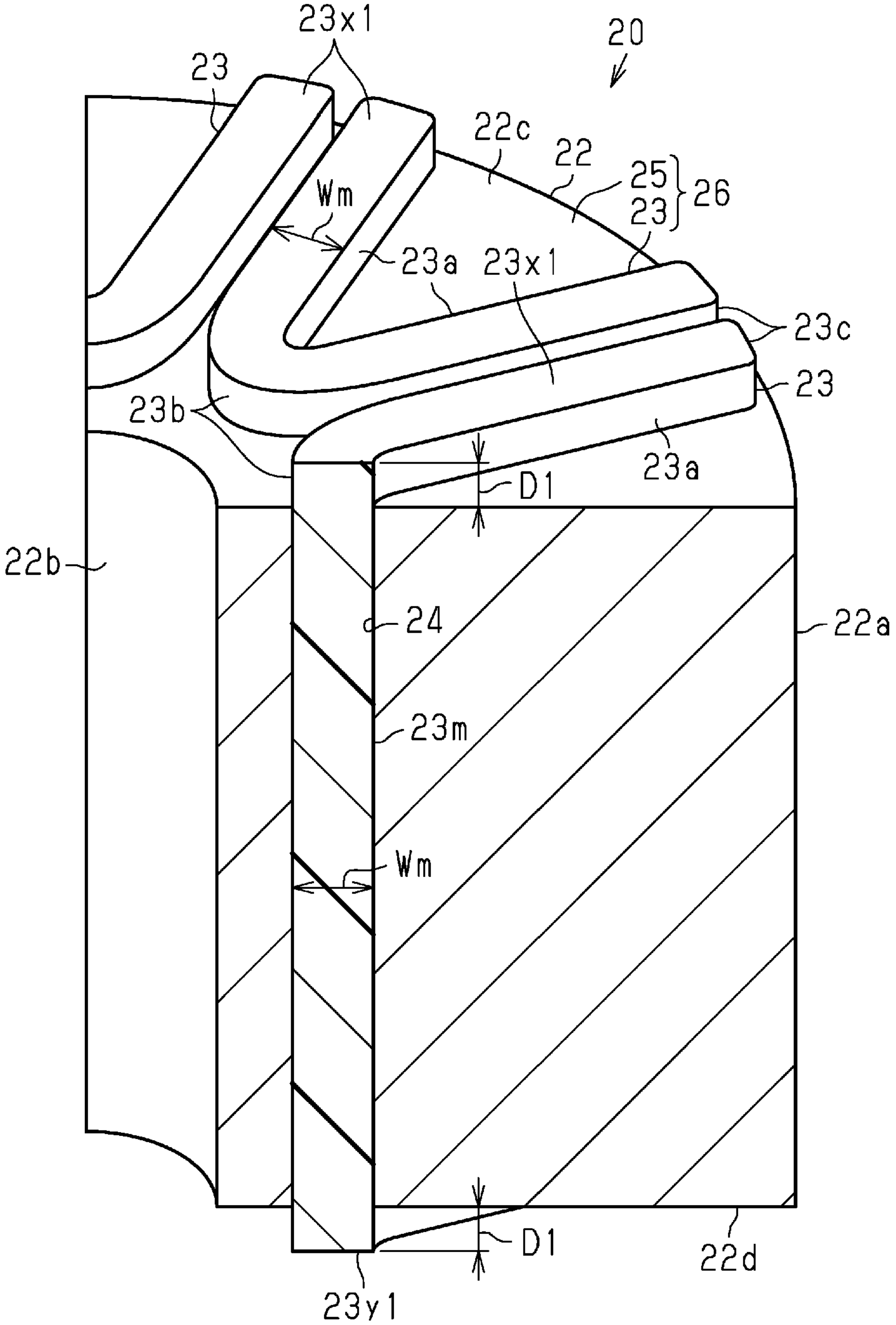
FIG. 5 is a perspective view of the rotor according to the embodiment.

As shown in FIGS. 4 and 5, each of the permanent magnets 23 is provided over the entire axial length of the rotor core 22. The axial end faces 22c and 22d of the rotor core 22 are formed as flat surfaces. Each of the permanent magnets 23 has the protruding portions 23x1 and 23y1 that axially protrude respectively from the axial end faces 22c and 22d of the rotor core 22. The protruding portions 23x1 and 23y1 are formed continuously along the V-shaped path including the straight portions 23a and curved portion 23b of the permanent magnet 23; and the thickness Wm of the protruding portions 23x1 and 23y1 is constant along the V-shape. The protruding portions 23x1 and 23y1 are located respectively on the axial end faces 22c and 22d of the rotor core 22. Moreover, in the present embodiment, the protruding portions 23x1 and 23y1 are formed of the same material as that of the embedded magnet portion 23m of the permanent magnet 23, which is located in the corresponding magnet-receiving hole 24 of the rotor core 22, and are formed continuously and integrally with the embedded magnet portion 23m of the permanent magnet 23.

The protruding portions 23x1 and 23y1 of the permanent magnets 23 are end portions of the permanent magnets 23 which are located on the axial end faces 22c and 22d of the rotor core 22. The protruding portions 23x1 and 23y1 of the permanent magnets 23 function to cause leakage magnetic flux φb as shown in FIG. 4 to be generated thereat; the leakage magnetic flux φb tends to be generated at the end portions of the permanent magnets 23. In other words, with the protruding portions 23x1 and 23y1, more of the magnetic flux generated by the embedded magnet portions 23m of the permanent magnets 23, which are located in the rotor core 22, flows radially without leaking out from the axial end faces 22c and 22d of the rotor core 22; thus, more of the magnetic flux becomes effective magnetic flux φa that contributes to the torque of the rotating electric machine M. The protruding portions 23x1 and 23y1 are formed to have a proper protruding amount D1 from the axial end faces 22c and 22d of the rotor core 22 while enabling an increase in the amount of the effective magnetic flux φa. It should be noted that the protruding amount D1 of the protruding portions 23x1 and 23y1 shown in the drawings may be different from the actual protruding amount D1.

The permanent magnets 23, which are provided mainly in the magnet-receiving holes 24 of the rotor core 22, are magnetized, after solidification of the magnet material, by a magnetizing apparatus (not shown) located outside the rotor core 22, so as to function as genuine permanent magnets. More specifically, in the present embodiment, eight permanent magnets 23 are arranged in the circumferential direction of the rotor core 22 and magnetized so that the polarities of the permanent magnets 23 are alternately different in the circumferential direction. In addition, each of the permanent magnets 23 is magnetized in its thickness direction.

Those portions of the rotor core 22 which are located on the inner side of the folded substantially V-shape of the permanent magnets 23 and radially outside the permanent magnets 23 function as outer core portions 25 facing the stator 10 to generate reluctance torque. When viewed along the axial direction, each of the outer core portions 25 has a substantially triangular shape with one vertex oriented toward the central part of the rotor 20. In the present embodiment, the rotor 20 has eight rotor magnetic poles 26 each including a corresponding one of the eight permanent magnets 23 and a corresponding one of the outer core portions 25 which is surrounded by the corresponding V-shaped permanent magnet 23. As shown in FIG. 1, the rotor magnetic poles 26 function as N poles and S poles alternately in the circumferential direction. The rotor 20 having the rotor magnetic poles 26 as described above can properly generate both magnet torque and reluctance torque.

(Magnetic Sensor 30)

As shown in FIG. 2, the rotating electric machine M includes a magnetic sensor 30 for detecting rotation information including the rotational position and rotational speed of the rotor 20. The magnetic sensor 30 may be implemented by a Hall element, a Hall IC or the like. The magnetic sensor 30 is provided on a circuit board 31 that is supported by the housing 14. The magnetic sensor 30 is arranged to axially face the protruding portions 23x1 of the permanent magnets 23 which are located on one side of the rotor core 22 in the axial direction. No other member is interposed between the magnetic sensor 30 and the protruding portions 23x1 of the permanent magnets 23 in the axial direction. That is, the magnetic sensor 30 is configured to be capable of detecting magnetic flux from the protruding portions 23x1 of the permanent magnets 23. Therefore, during rotation of the rotor 20, it is possible to acquire the rotation information of the rotor 20 based on a signal that is outputted from the magnetic sensor 30 and depends on the density of the magnetic flux.

As shown in FIG. 3, the distance from the outer circumferential surface 22a of the rotor core 22 to the center of the magnetic sensor 30 in an axial view is defined as a sensor position Ps. In the present embodiment, the sensor position Ps is set to satisfy the following relationship with the embedding depth Lm: Ps<Lm. Moreover, the magnetic sensor 30 is located to overlap the straight portions 23a of the permanent magnets 23 in the axial direction.

As shown in FIG. 4, the distance from the rotor core 22 to the magnetic sensor 30 in the axial direction is denoted by Hs; and the distance from the protruding portions 23x1 of the permanent magnets 23 to the magnetic sensor 30 in the axial direction is denoted by Hm. In the present embodiment, the distance Hs is set to satisfy the following relationship with the distance Hm: Hm<Hs.

Next, operation of the rotating electric machine M according to the present embodiment will be described.

In the rotor 20 of the rotating electric machine M, the permanent magnets 23 embedded in the rotor core 22 have their respective end portions protruding, as the protruding portions 23x1 and 23y1, from the axial end faces 22c and 22d of the rotor core 22 respectively on opposite axial sides of the rotor core 22. Since the end portions of the permanent magnets 23 are configured as the protruding portions 23x1 and 23y1, the leakage magnetic flux φb generated at the end portions of the permanent magnets 23 will be concentrated on the protruding portions 23x1 and 23y1. Moreover, for the embedded magnet portions 23m of the permanent magnets 23 which are located in the rotor core 22, the paths through which the magnetic flux generated by the embedded magnet portions 23m may leak out from the axial end faces 22c and 22d of the rotor core 22 are extended beyond the protruding portions 23x1 and 23y1; therefore, the lengths of the paths of the magnetic flux are increased. Consequently, it becomes possible to suppress the magnetic flux generated by the embedded magnet portions 23m of the permanent magnets 23 from leaking out from the axial end faces 22c and 22d of the rotor core 22; thus, it becomes possible for the magnetic flux generated by the embedded magnet portions 23m to radially flow through the rotor core 22 over the entire axial length thereof. As a result, most of the magnetic flux generated by the embedded magnet portions 23*m* becomes the effective magnetic flux φa that contributes to the torque of the rotating electric machine M; thus, it becomes possible to increase the amount of the effective magnetic flux φa.

Figure 6A:
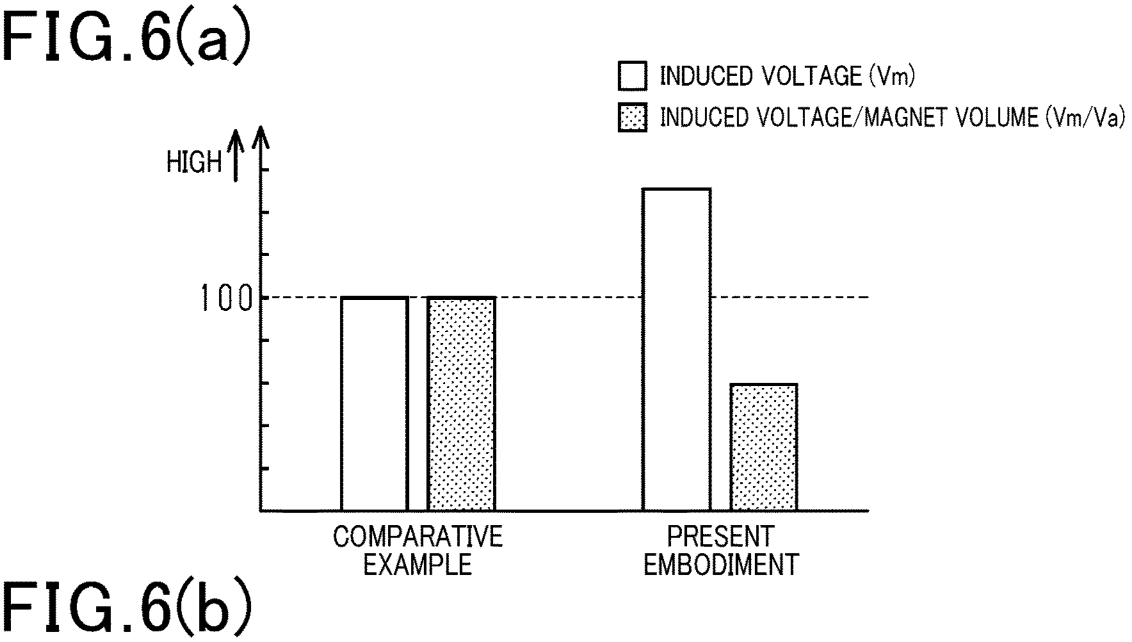
FIGS. 6(*a*) to 6(*c*) are explanatory diagrams for explaining the characteristics of the rotor according to the embodiment.
Figure 6B:
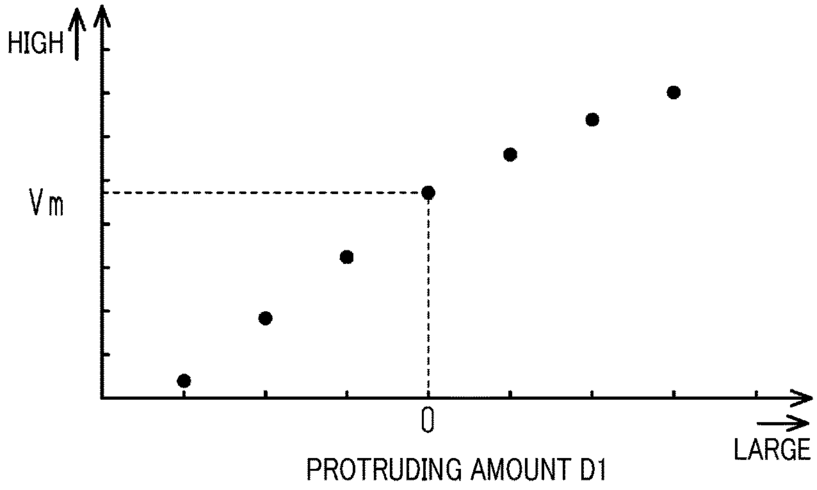
Figure 6C:
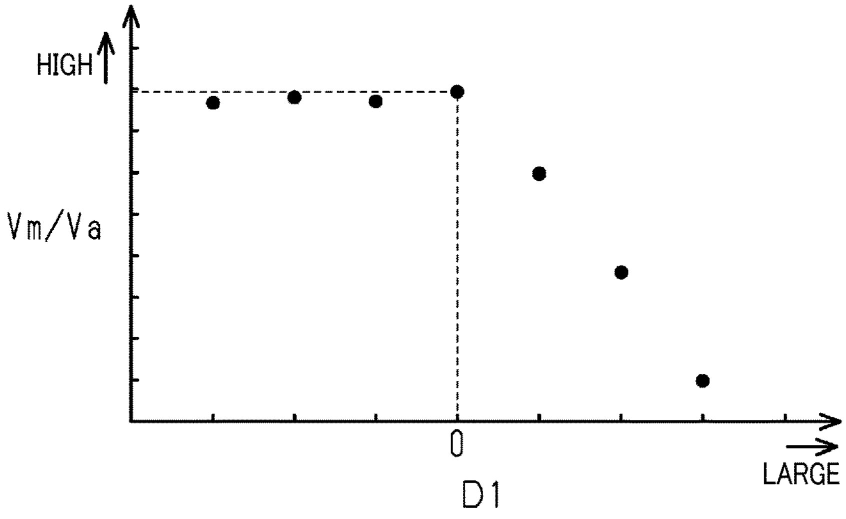

FIG. 6(*a*) shows the results of a comparison between the rotor 20 according to the present embodiment and a rotor according to a comparative example. The rotor 20 according to the present embodiment is configured so that the end portions of the permanent magnets 23 protrude, as the protruding portions 23*x*1 and 23*y*1, from the axial end faces 22*c* and 22*d* of the rotor core 22 respectively on opposite axial sides of the rotor core 22. In contrast, the rotor according to the comparative example has a conventionally well-known configuration where the end portions of the permanent magnets 23 do not protrude from the axial end faces 22*c* and 22*d* of the rotor core 22. The comparison is made in terms of the induced voltage Vm generated in the rotating electric machine M and the quotient (Vm/Va) of the induced voltage Vm divided by the volume Va of the permanent magnets 23; and the parameters Vm and (Vm/Va) are shown in relative values that are 100 in the comparative example.

The rotor 20 according to the present embodiment is considerably higher in the induced voltage Vm than the rotor according to the comparative example. This is because in the rotor 20 according to the present embodiment, the leakage magnetic flux φb is generated at the protruding portions 23*x*1 and 23*y*1 of the permanent magnets 23; therefore, most of the magnetic flux generated by the embedded magnet portions 23*m* of the permanent magnets 23 becomes the effective magnetic flux φa and thus the amount of the effective magnetic flux φa is increased. FIG. 6(*b*) illustrates the relationship between the protruding amount D1 of the protruding portions 23*x*1 and 23*y*1 and the induced voltage Vm. As can be seen from FIG. 6(*b*), setting the protruding amount D1 of the protruding portions 23*x*1 and 23*y*1 to be larger than zero, i.e., configuring the end portions of the permanent magnets 23 to protrude from the axial end faces 22*c* and 22*d* of the rotor core 22, the amount of the effective magnetic flux φa increases and thus the induced voltage Vm also increases. On the other hand, with increase in the magnet volume Va due to the provision of the protruding portions 23*x*1 and 23*y*1 in the permanent magnets 23, the rotor 20 according to the present embodiment becomes lower in the induced voltage/magnet volume (Vm/Va) than the rotor according to the comparative example. FIG. 6(*c*) illustrates the relationship between the protruding amount D1 of the protruding portions 23*x*1 and 23*y*1 and the induced voltage/magnet volume (Vm/Va). As can be seen from FIG. 6(*c*), setting the protruding amount D1 of the protruding portions 23*x*1 and 23*y*1 to be larger than zero, the magnet volume Va increases and thus the induced voltage/magnet volume (Vm/Va) decreases. Therefore, the protruding amount D1 of the protruding portions 23*x*1 and 23*y*1 is set properly in consideration of the above relationships of the protruding amount D1 with the induced voltage Vm and the induced voltage/magnet volume (Vm/Va). Moreover, with increase in the protruding amount D1, the weight of the rotor 20 and the amount of the magnet material for forming the permanent magnets 23 also increase; therefore, it is preferable to set the protruding amount D1 properly taking into account this fact as well.

Figure 7:
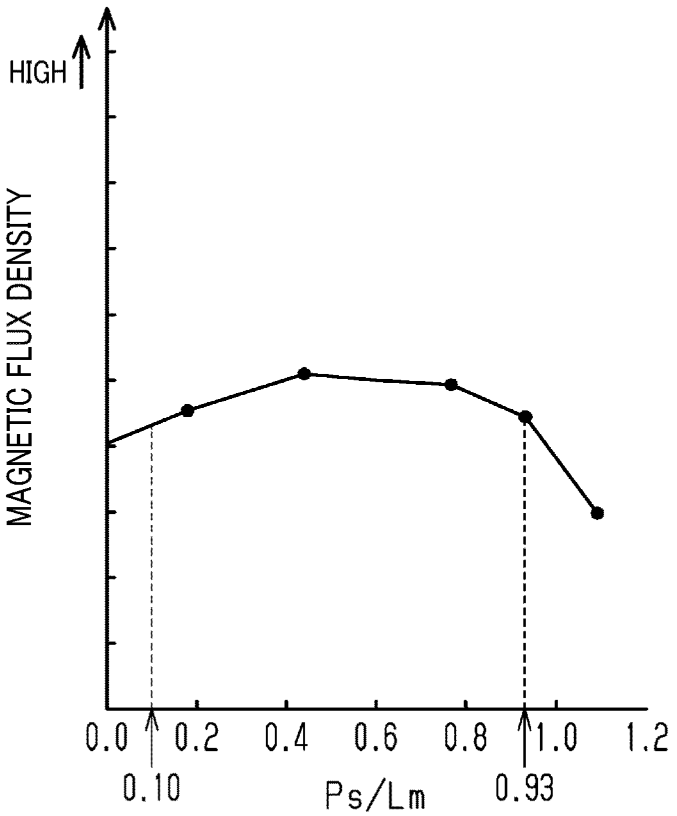
FIG. 7 is an explanatory diagram for explaining the characteristics of the rotating electric machine according to the embodiment.

The graph shown in FIG. 7 illustrates the relationship between the ratio Ps/Lm of the sensor position Ps to the embedding depth Lm and the magnetic flux density detected by the magnetic sensor 30. It should be noted that in the graph, the ratio Hm/Hs of the distance Hm to the distance Hs is kept constant at, for example, 0.71 regardless of the magnitude of the ratio Ps/Lm. As shown in FIG. 7, the magnetic flux density detected by the magnetic sensor 30 remains high when the ratio Ps/Lm is in the range of $0.10 \leq Ps/Lm \leq 0.93$. Moreover, with increase in the ratio Ps/Lm over 0.93, the magnetic flux density detected by the magnetic sensor 30 is significantly lowered. Therefore, setting the ratio Ps/Lm to be in the range of $0.10 \leq Ps/Lm \leq 0.93$, it is possible to easily secure the magnetic flux density required to detect rotation of the rotor 20.

Figure 8:
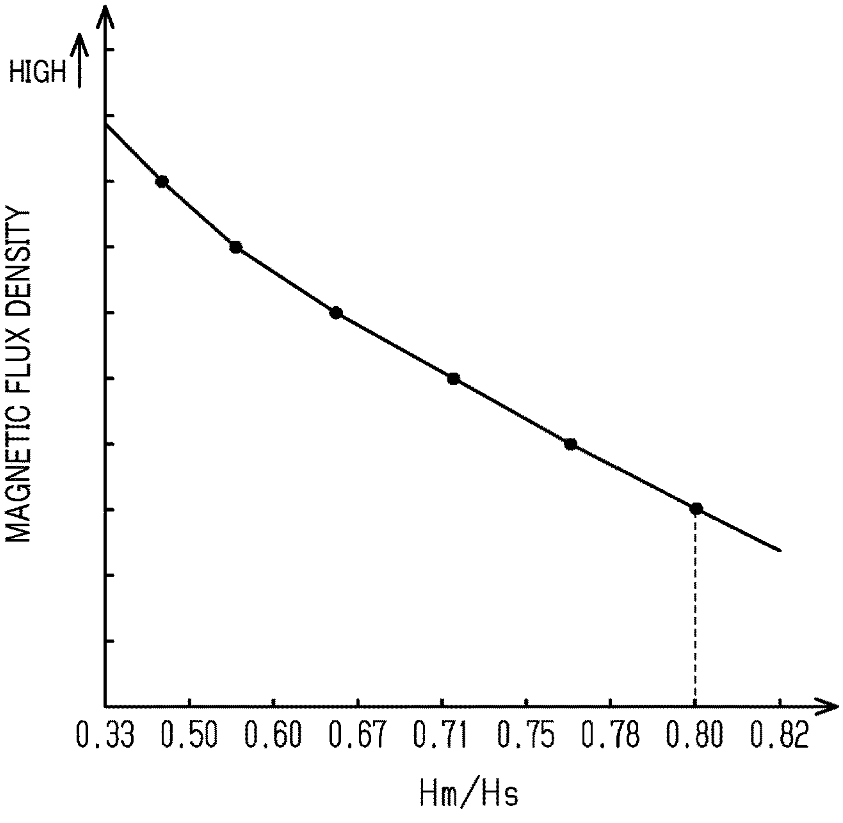
FIG. 8 is another explanatory diagram for explaining the characteristics of the rotating electric machine according to the embodiment.

The graph shown in FIG. 8 illustrates the relationship between the ratio Hm/Hs of the distance Hm to the distance Hs and the magnetic flux density detected by the magnetic sensor 30. It should be noted that in the graph, the ratio Ps/Lm is kept constant at, for example, 0.44 regardless of the magnitude of the ratio Hm/Hs. As shown in FIG. 8, the magnetic flux density detected by the magnetic sensor 30 increases with decrease in the ratio Hm/Hs. Setting the ratio Hm/Hs to be in the range of $Hm/Hs \leq 0.8$, it is possible to easily secure the magnetic flux density required to detect rotation of the rotor 20.

Next, advantageous effects achievable according to the present embodiment will be described.

(1) Each of the permanent magnets 23 has a folded shape that is convex inward in a radial direction of the rotor 20. The magnetic sensor 30 is arranged to face the permanent magnets 23 and configured to be capable of detecting magnetic flux from the permanent magnets 23. With this configuration, it is possible to acquire the rotation information of the rotor 20 based on the magnetic flux from the permanent magnets 23 of the rotor 20 which is detected by the magnetic sensor 30. That is, it becomes possible to detect rotation of the rotor 20 without providing any sensor magnet for rotation detection separately from the permanent magnets 23 of the rotor 20. Consequently, it becomes possible to suppress increase in the number of parts of the rotating electric machine M. Moreover, the permanent magnets 23 of the rotor 20 are not provided on the outer circumferential surface 22*a* of the rotor core 22, but embedded in the rotor core 22. Furthermore, each of the permanent magnets 23 has the folded shape that is convex inward in the radial direction of the rotor 20. Therefore, the radial range within which the permanent magnets 23 are provided in the rotor 20 is widened. Consequently, it becomes possible to configure the rotating electric machine M so that the arrangement position of the magnetic sensor 30 is not limited to the vicinity of the outer circumferential surface 22*a* of the rotor core 22. As a result, it becomes possible to improve the degree of freedom in arranging the magnetic sensor 30 in the rotating electric machine M.

(2) For each of the permanent magnets 23, the distance on the circumferential centerline Ls of the permanent magnet 23 from the outer circumferential surface 22*a* of the rotor core 22 to the inside surface of the curved portion 23*b* of the permanent magnet 23 is defined as the embedding depth Lm. Moreover, the distance from the outer circumferential surface 22*a* of the rotor core 22 to the center of the magnetic sensor 30 in an axial view is defined as the sensor position Ps. Furthermore, the embedding depth Lm and the sensor position Ps are set to satisfy $Ps < Lm$. With this configuration, the magnetic sensor 30 is located radially outside the curved portions 23*b* of the permanent magnets 23. Consequently, it becomes possible to suitably detect the magnetic flux from the permanent magnets 23 using the magnetic sensor 30.

(3) The ratio Ps/Lm of the sensor position Ps to the embedding depth Lm is set to satisfy $0.10 \leq Ps/Lm \leq 0.93$.

With this configuration, as shown in FIG. 7, it is possible to easily secure the magnetic flux density required to detect rotation of the rotor 20.

(4) The axial end faces 22*c* and 22*d* of the rotor core 22 are formed as flat surfaces. Each of the permanent magnets 23 has the protruding portions 23*x*1 and 23*y*1 that axially protrude respectively from the axial end faces 22*c* and 22*d* of the rotor core 22. The magnetic sensor 30 is configured to be capable of detecting the magnetic flux from the protruding portions 23*x*1 of the permanent magnets 23 which are located on one side of the rotor core 22 in the axial direction.

With the above configuration, the end portions of the permanent magnets 23 protrude, as the protruding portions 23*x*1 and 23*y*1, from the axial end faces 22*c* and 22*d* of the rotor core 22 which are formed as flat surfaces. Therefore, to leak out from the axial end faces 22*c* and 22*d* of the rotor core 22, it would be necessary for the magnetic flux generated by the embedded magnet portions 23*m* of the permanent magnets 23, which are located in the rotor core 22, to flow beyond the protruding portions 23*x*1 and 23*y*1. That is, the lengths of the paths through which the magnetic flux generated by the embedded magnet portions 23*m* may leak out are increased. Consequently, it becomes possible to suppress leakage of the magnetic flux generated by the embedded magnet portions 23*m*. The magnetic flux generated by the embedded magnet portions 23*m* of the permanent magnets 23 constitutes the effective magnetic flux φa that contributes to the torque of the rotating electric machine M. Therefore, by minimizing leakage of the magnetic flux generated by the embedded magnet portions 23*m*, it is possible to increase the amount of the effective magnetic flux φa and thereby improve the torque performance of the rotating electric machine M. Moreover, the axial end faces 22*c* and 22*d* of the rotor core 22 are shaped as general flat surfaces; thus, it becomes possible to realize, with the simple countermeasure of configuring the end portions of the permanent magnets 23 to protrude from the axial end faces 22*c* and 22*d* of the rotor core 22, suppression of leakage of the magnetic flux generated by the embedded magnet portions 23*m*. Furthermore, since the magnetic sensor 30 is configured to detect the magnetic flux from the protruding portions 23*x*1 of the permanent magnets 23 which protrude from the rotor core 22, it becomes possible to suitably detect the magnetic flux from the permanent magnets 23 using the magnetic sensor 30.

(5) The magnetic sensor 30 is arranged to face the protruding portions 23*x*1 of the permanent magnets 23 in the axial direction. Consequently, it becomes possible to suitably detect the magnetic flux from the protruding portions 23*x*1 of the permanent magnets 23 using the magnetic sensor 30.

(6) The distance from the rotor core 22 to the magnetic sensor 30 in the axial direction is denoted by Hs; and the distance from the protruding portions 23*x*1 of the permanent magnets 23 to the magnetic sensor 30 in the axial direction is denoted by Hm. The distance Hm and the distance Hs are set to satisfy $Hm<Hs$. With this configuration, the distance Hm from the protruding portions 23*x*1 of the permanent magnets 23 to the magnetic sensor 30 becomes shorter than the distance Hs from the rotor core 22 to the magnetic sensor 30. Consequently, it becomes possible to suitably detect the magnetic flux from the protruding portions 23*x*1 of the permanent magnets 23 using the magnetic sensor 30.

(7) The ratio Hm/Hs of the distance Hm to the distance Hs is set to satisfy $Hm/Hs \leq 0.8$. With this configuration, as shown in FIG. 8, it is possible to easily secure the magnetic flux density required to detect rotation of the rotor 20.

(8) The protruding portions 23*x*1 and 23*y*1 of the permanent magnets 23 are formed to have a constant protruding amount D1 from the axial end faces 22*c* and 22*d* of the rotor core 22. Consequently, leakage of the magnetic flux generated by the embedded magnet portions 23*m* of the permanent magnets 23 can be suppressed uniformly at each location; the magnetic flux generated by the embedded magnet portions 23*m* contributes to the torque of the rotating electric machine M.

(9) The protruding portions 23*x*1 and 23*y*1 of the permanent magnets 23 have the same protruding shape from the axial end faces 22*c* and 22*d* of the rotor core 22 on both the axial sides of the rotor core 22. Consequently, it becomes possible to maintain good weight balance of the rotor 20.

(10) In each of the permanent magnets 23, the protruding portions 23*x*1 and 23*y*1 of the permanent magnet 23 are formed continuously in the extending direction of the V-shape of the permanent magnet 23 along the axial end faces 22*c* and 22*d* of the rotor core 22. Consequently, leakage of the magnetic flux generated by the embedded magnet portions 23*m* of the permanent magnets 23 can be more reliably suppressed over the entire permanent magnets 23; the magnetic flux generated by the embedded magnet portions 23*m* contributes to the torque of the rotating electric machine M.

(11) In each of the permanent magnets 23, the protruding portions 23*x*1 and 23*y*1 of the permanent magnet 23 are formed continuously and integrally with the embedded magnet portion 23*m* of the permanent magnet 23. Therefore, the protruding portions 23*x*1 and 23*y*1 and embedded magnet portion 23*m* of each of the permanent magnets 23 can be easily formed, for example can be formed of the same material at the same time.

(12) The protruding portions 23*x*1 and 23*y*1 are provided in all the permanent magnets 23 arranged in the circumferential direction of the rotor 20. Consequently, it becomes possible to suppress, for all the permanent magnets 23, leakage of the magnetic flux generated by the embedded magnet portions 23*m* of the permanent magnets 23; the magnetic flux generated by the embedded magnet portions 23*m* contributes to the torque of the rotating electric machine M. Moreover, it also becomes possible to more reliably maintain good weight balance of the rotor 20.

The present embodiment can be modified and implemented as follows. Moreover, the present embodiment and the following modifications can also be implemented in combination with each other to the extent that there is no technical contradiction between them.

The configuration of the protruding portions 23*x*1 and 23*y*1, which are the end portions of the permanent magnets 23 protruding from the axial end faces 22*c* and 22*d* of the rotor core 22, may be modified as appropriate.

For example, in each of the permanent magnets 23, protruding portions may be formed only at part of the V-shaped path including the straight portions 23*a* and curved portion 23*b* of the permanent magnet 23.

Figure 9:
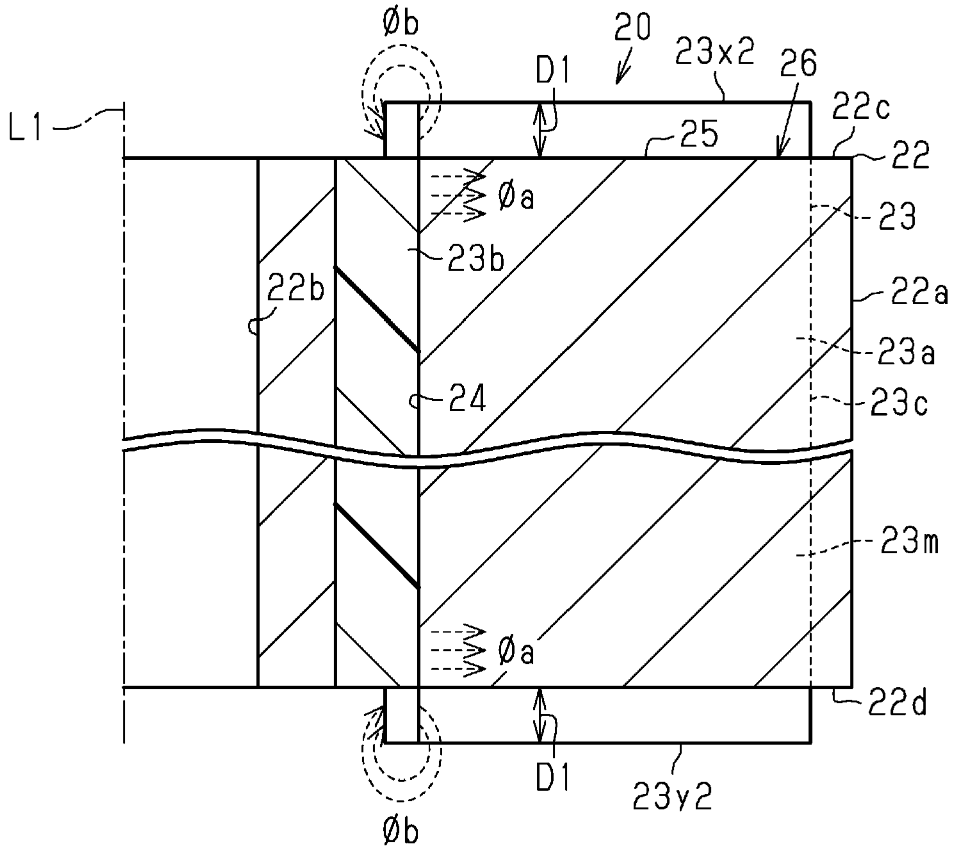
FIG. 9 is a cross-sectional view of a rotor according to a modification.

For example, as shown in FIG. 9, in each of the permanent magnets 23, protruding portions 23*x*2 and 23*y*2 may be formed which protrude only at the straight portions 23*a* of the permanent magnet 23. In addition, the protruding portions 23*x*2 and 23*y*2 may be formed similarly on both the axial end faces 22*c* and 22*d* of the rotor core 22.

Moreover, for example, in each of the permanent magnets 23, there may be formed protruding portions that protrude only at parts of the straight portions 23*a* of the permanent magnet 23. Furthermore, for example, in each of the permanent magnets 23, protruding portions may be formed only at half of the V-shape of the permanent magnet 23, i.e., only at one of the straight portions 23*a* and half of the curved portion 23*b* of the permanent magnet 23.

As above, by forming protruding portions only at part of the V-shaped path including the straight portions 23*a* and curved portion 23*b* of each of the permanent magnets 23, advantageous effects can be achieved such as reduction in the amount of the magnet material required for the permanent magnets 23 and reduction in the weight of the rotor 20.

Moreover, for example, the shape of the protruding portions provided in the permanent magnets 23 may be changed. The protruding amount D1 may vary depending on the parts of the protruding portions.

Furthermore, for example, protruding portions having different configurations may be provided respectively on the axial end faces 22*c* and 22*d* of the rotor core 22.

Moreover, for example, in each of the permanent magnets 23, the protruding portions 23*x*1 and 23*y*1 of the permanent magnet 23 may be formed separately from the embedded magnet portion 23*m* of the permanent magnet 23. In this case, different magnet materials may be used respectively for the protruding portions and the embedded magnet portion. As a result, advantageous effects can be achieved such as increase in the degree of freedom of the configuration of the permanent magnets 23. In addition, in this case, the protruding portions 23*x*1 and 23*y*1 formed separately from the embedded magnet portion 23*m* are still portions of the permanent magnet 23 that is a rotor magnet; therefore, there is no increase in the number of parts of the rotating electric machine M.

In the above-described embodiment, each of the permanent magnets 23 is formed continuously and at the constant thickness Wm along the V-shaped path including the straight portions 23*a* and curved portion 23*b* of the permanent magnet 23. Alternatively, for each of the permanent magnets 23, the thickness Wm of the curved portion 23*b* of the permanent magnet 23 may be set to be smaller than the thickness Wm of the straight portions 23*a* of the permanent magnet 23.

In the above-described embodiment, the protruding portions 23*x*1 and 23*y*1 are provided in all the permanent magnets 23 arranged in the circumferential direction of the rotor 20. Alternatively, the protruding portions 23*x*1 and 23*y*1 may be provided in only some of the permanent magnets 23. With this configuration, advantageous effects can be achieved such as reduction in the amount of the magnet material required for the permanent magnets 23 and reduction in the weight of the rotor 20.

Each of the permanent magnets 23 does not necessarily have both the protruding portions 23*x*1 and 23*y*1; and one or both of the protruding portions 23*x*1 and 23*y*1 may be omitted from the configuration of the permanent magnets 23. That is, the axial ends of the permanent magnets 23 may be located flush with the corresponding axial end faces 22*c* and 22*d* of the rotor core 22, or located inside the rotor core 22. With this configuration, it is still possible to detect the magnetic flux from the permanent magnets 23 using the magnetic sensor 30.

The shape of the permanent magnets 23 is not limited to the V-shape, but may be other folded shapes (e.g., a U-shape) that are convex inward in the radial direction of the rotor 20. Moreover, the permanent magnets 23 may have other shapes than folded shapes, such as an I-shape.

In the above-described embodiment, the permanent magnets 23 are formed by injection-molding the magnet material into the magnet-receiving holes 24 of the rotor core 22. Alternatively, the permanent magnets 23 may be manufactured in advance and inserted into and fixed in the magnet-receiving holes 24 of the rotor core 22.

The arrangement position of the magnetic sensor 30 is not limited to that in the above-described embodiment, but may be changed as appropriate depending on the configuration of the rotating electric machine M.

Specifically, in the above-described embodiment, the magnetic sensor 30 is arranged to face the protruding portions 23*x*1 of the permanent magnets 23 in the axial direction. Alternatively, the magnetic sensor 30 may be arranged to face the radially inner side surfaces of the curved portions 23*b* of the permanent magnets 23.

In addition to the above modifications, the configuration of the rotor 20 and the configuration of the rotating electric machine M may be further modified as appropriate.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. A rotating electric machine comprising:
- a rotor having a permanent magnet embedded in a magnet-receiving hole of a rotor core;
- a stator that applies a rotating magnetic field to the rotor; and
- a magnetic sensor that detects rotation information of the rotor, wherein
- the permanent magnet has a folded shape that is convex inward in a radial direction of the rotor,
- the magnetic sensor is arranged to face the permanent magnet and configured to be capable of detecting magnetic flux from the permanent magnet,
- the rotor core has an axial end face formed as a flat surface,
- the permanent magnet has a protruding portion that protrudes from the axial end face of the rotor core, and
- the magnetic sensor is configured to be capable of detecting the magnetic flux from the protruding portion of the permanent magnet.

2. The rotating electric machine as set forth in claim 1, wherein
- an embedding depth Lm and a sensor position Ps are set to satisfy $Ps<Lm$,
- the embedding depth Lm denotes a distance on a circumferential centerline of the permanent magnet from an outer circumferential surface of the rotor core to an inside surface of a curved portion of the permanent magnet, and
- the sensor position Ps denotes a distance from the outer circumferential surface of the rotor core to a center of the magnetic sensor in an axial view.

3. The rotating electric machine as set forth in claim 2, wherein
- the ratio Ps/Lm of the sensor position Ps to the embedding depth Lm is set to satisfy $0.10 \leq Ps/Lm \leq 0.93$.

4. The rotating electric machine as set forth in claim 1, wherein
- the magnetic sensor is arranged to face the protruding portion of the permanent magnet in an axial direction.

5. The rotating electric machine as set forth in claim 4, wherein $Hm<Hs$,
- where Hm is a distance from the protruding portion of the permanent magnet to the magnetic sensor in the axial direction, and Hs is a distance from the rotor core to the magnetic sensor in the axial direction.

6. The rotating electric machine as set forth in claim 5, wherein the ratio Hm/Hs of the distance Hm to the distance Hs is set to satisfy Hm/Hs≤0.8.

7. The rotating electric machine as set forth in claim 1, wherein the protruding portion of the permanent magnet has a constant protruding amount from the axial end face of the rotor core.

8. The rotating electric machine as set forth in claim 1, wherein the protruding portion is provided partially in an extending direction of the permanent magnet along the axial end face of the rotor core.

* * * * *